Oct. 24, 1933.    M. E. REAGAN    1,932,046
TRANSFER SCHEME FOR SYNCHRONOUS MOTORS OR CONDENSERS
Filed Jan. 17, 1931

INVENTOR
Maurice E. Reagan
BY
Wesley G. Carr
ATTORNEY

WITNESSES
Arthur J. McMahon
P. E. Friedemann

Patented Oct. 24, 1933

1,932,046

UNITED STATES PATENT OFFICE 1,932,046

TRANSFER SCHEME FOR SYNCHRONOUS MOTORS OR CONDENSERS

Maurice E. Reagan, Wilkinsburg, Pa., assignor to Westinghouse Electric & Manufacturing Company, a corporation of Pennsylvania Application January 17, 1931. Serial No. 509,334

8 Claims. (Cl. 171—118)

This invention pertains to a system for automatically starting alternating-current motors and is especially adapted for use in starting motor-generator sets in automatically or semi-automatically operated substations.

This system is especially designed for the starting of synchronous motors although it may be easily adapted for use with induction motors.

One object of my invention is to provide a motor-starting system in which the motor is started on a reduced voltage and is transferred to normal running voltage when it has reached substantially synchronous speed.

Another object of my invention is to control the transfer of the motor from starting to running connections in response to changes of the armature current of the motor.

A further object of my invention is to control the transfer of the motor from starting to running connections and also the excitation of the motor in response to the variations in load current of the motor.

It is also an object of my invention to control the starting operation of the motor in response to variations in load current of the motor, in response to time, and in response to the rise in voltage of an exciter or generator connected to the motor shaft.

A more specific object of my invention comprises the provision of a method of and means for starting a motor on reduced voltage, controlling the operation of a time-limit device in response to the variations of load current resulting from the rise in speed of the motor, causing a rise in the voltage of the exciter or generator driven by the motor by the operation of the time-limit device, impressing the exciter or generator voltage on the field windings of the motor, transferring the motor from the low starting voltage to high running voltage in response to the rise of exciter or generator voltage and increasing the excitation of the motor field windings.

Figure 1:
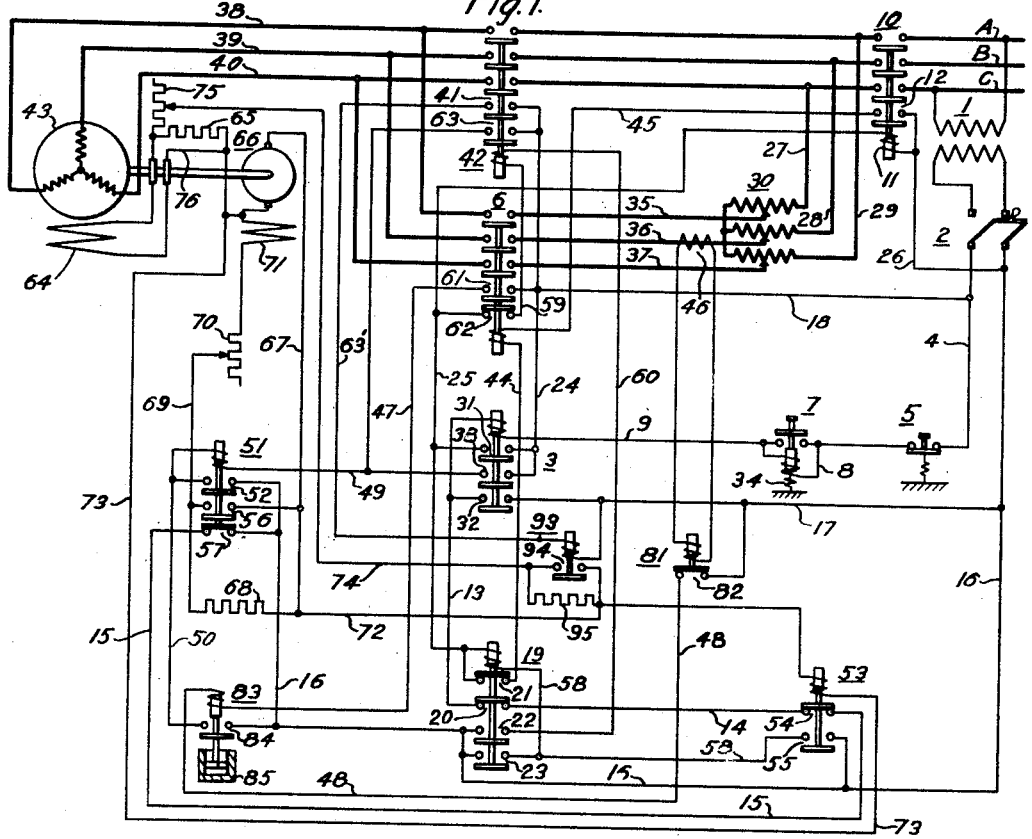
Figure 2:
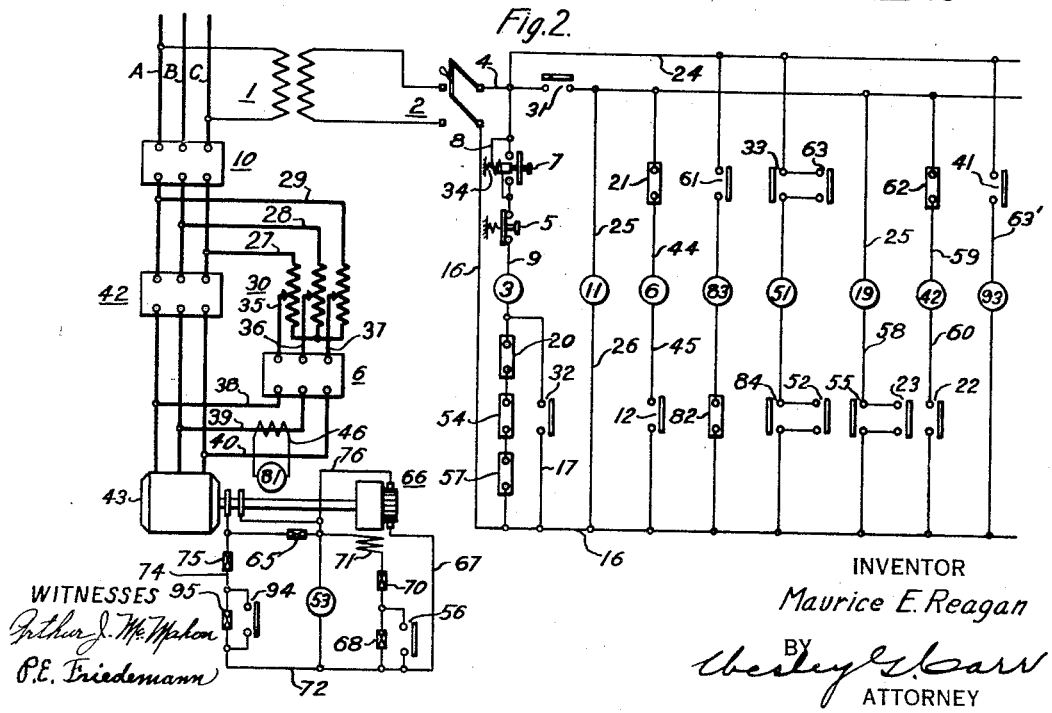

Other objects and advantages will become more apparent from a study of the following specification when taken in conjunction with the accompanying drawing, in which:

Figure 1 is a diagram of the complete circuit of the system embodying my invention; and Fig. 2 is a schematic diagram of the same circuit which is shown in full in Fig. 1.

In Fig. 1, is illustrated a synchronous motor 43 which may be supplied with electrical energy from a source of alternating current power designated by the lines A, B and C, through a main circuit breaker 10. Auto-transformers 30 and a starting switch or low voltage contactor 6 are provided for starting the motor on reduced voltage, and a running switch or contactor 42 is utilized to connect the motor directly to the supply lines A, B and C after it has reached synchronous speed.

The field windings 64 of the motor are connected, through slip rings, directly across a discharge resistor 65 having a relatively high resistance value. Connected in parallel circuit relation to 65 the discharge resistor is a circuit including the armature windings of the exciter 66, which is mechanically coupled to the shaft of the synchronous motor 43. Obviously, during the initial stages of acceleration of the synchronous motor 43, when the voltage of the exciter will be low, an effective discharge circuit is provided for the field windings 64 of the synchronous motor. There is thus no danger that the insulation will be injured by the high voltages that would be induced in the field windings on open circuit during the starting operation of the synchronous motor.

Energy for the operation of the control devices to be described hereinafter, is taken from the supply lines A, B and C by means of a transformer 1. A switch 2 is provided to connect the secondary of the transformer 1 to alternating current control busses 4 and 16. The remaining control elements of the starting system of my invention will be described and their functions stated during the progress of the description of the operation which will now be given.

The starting of motor 43, according to my invention, is controlled by a switch 7 which is illustrated as a push-button switch, although it is to be understood that any automatically operated or remotely controlled switch may be substituted for that shown. Assuming switch 2 is closed, then the closing of the switch 7 against the biasing effect of spring 34 establishes a circuit from the bus 4 through the stop push-button switch 5, the starting push button switch 7, conductor 9, the actuating coil of master relay 3, conductor 13, back contact members 20 of voltage transfer relay 19, conductor 14, back contact members 54 of voltage relay 53, conductor 15, back contact member 57 of resistor shunting relay 51, to the bus 16. It will be noted that the operation of the starting push-button switch 7 establishes a holding circuit through 8 for the switch and the starting push-button switch 7 will be retained in closed position against the biasing effect of the spring 34 so long as the circuit through 8 is not interrupted by the operation of the stopping push-button switch 5. Operation of the master relay 3 establishes a holding circuit for this relay which extends from the energized conductor 13 through the contact members 32 and conductor 17 to the bus 16.

When the master relay 3 is actuated to its closed position, a circuit is established which extends from the bus 4 through conductors 18 and 24, the contact members 31 of the master relay 3, conductor 25, actuating coil 11 of the main line contactor 10, and conductor 26 to the bus 16. Upon the operation of the main line contactor 10 to its closed position it establishes a circuit which may be traced from the energized conductor 25 through the back contact members 21 of the voltage transfer relay 19, conductor 44, the actuating coil of the low voltage line contactor 6, conductor 45, the contact members 12 of the main line contactor 10 and conductor 26 to the bus 16.

Assuming that the low voltage line contact 6 is actuated to its closed position then a circuit for the stator of the synchronous motor 43 is established which extends from the source of alternating current through the contact members 12 of the main line contactor 10, conductors 27, 28 and 29, auto-transformer 30, the low voltage taps 35, 36 and 37, the main contact members of the contactor 6, conductors 38, 39 and 40 to the stator of the synchronous motor. When the stator is supplied with alternating current a current is induced, by transformer action, in the field windings 64 of the synchronous motor, the frequency of this induced current during the accelerating period of the synchronous motor will depend upon the per cent slip of the rotor. The current induced in the field windings 64 discharges through the resistor 65 which has a relatively high resistance value.

Since the resistor 65 is continuously connected in the circuit, it is necessary that its ohmic value be high so that there will be no appreciable heating loss during the normal operation of the synchronous motor. The field windings 64, through the slip rings of the synchronous motor, are also connected across the armature of the exciter 66. This closed circuit may be traced from one of the slip rings of the synchronous motor through conductor 76, the armature of the exciter 66, conductor 67, conductor 72, resistor 95, conductor 74 and the field rheostat 75 to the other slip ring of the synchronous motor. From the circuits traced hereinbefore it will be apparent that the field windings of the synchronous motor, as long as the voltage of the exciter is low, discharges through the resistor 65 and the armature of the exciter. The resistor 65 is permanently connected across the slip rings and prevents injury to the field of the synchronous motor if for any reason the exciter is disconnected from the field winding 64.

Immediately after the operation of the main line contactor 10 and the low voltage contactor 6, a heavy current will be drawn by the synchronous motor, thereby causing the energization of the current relay 81 by the energy supplied from the current transformer 46. Energization of the current relay 81 causes the opening of the contact members 82 of this relay and thus prevents the operation of the time-limit relay 83 as will be explained more in detail hereinafter.

The time-limit relay 83 may embody any well known time-limit device, and applicant does not wish to be limited to the particular arrangements herein shown. The time-limit relay 83 is provided with adjusting means 85 for predetermining the time of closing of the contact members 84 after energization of the actuating coils of the time-limit relay 83. As the synchronous motor accelerates and the current taken from the line decreases, the current relay 81 will become substantially deenergized at some predetermined load-current of the synchronous motor. The current relay 81 is so designed and adjusted that the contact members 82 close when approximately synchronous speed has been attained by the synchronous motor. The instant the contact members 82 move to their closed position a circuit is established from the bus 4 through conductor 18, contact member 61 of the low-voltage contactor 6, conductor 47, the actuating coil of the time-limit device 83, conductor 48, contact member 82 of the current relay 81 and conductor 17 to the bus 16.

After a predetermined interval of time, depending upon the adjustment of the time-limit relay 83, a circuit is established from the bus 4 through conductors 18 and 24, contact members 33 of the master relay 3, conductor 49, the actuating coil of the control relay 51, conductor 50, contact members 84 of the time-limit relay 83 to the bus 16. Closure of the control relay 51 establishes a holding circuit for this relay which may be traced from the energized conductor 50 and contact members 52 to the bus 16. For the desired starting operation the time constant of the time-limit device is so adjusted that none of the operations following the closing of contact members 84 take place before synchronous speed of the motor has been attained.

A resistor 68 is connected in series circuit relation with the field windings 71 of the exciter 66. The resistance value of the resistor 68 is comparatively high, and prior to the operation of the resistor shunting relay 51, the excitation of the exciter is comparatively weak and in consequence the voltage of the exciter remains low during the accelerating period of the synchronous motor up to the instant the relay 51 operates. Operation of the resistor shunting relay 51 causes the closing of the contact members 56 thereby shunting the resistor 68 whereupon the voltage of the exciter immediately increases. The circuit for the series field windings may be traced from the upper armature terminal of the exciter 66, through conductor 67, the contact members 56 of the resistor shunting relay 51, conductor 69, the field rheostat 70 and the field windings 71 to the lower armature terminal. At some predetermined exciter voltage the voltage relay 53 is energized by a circuit which may be traced from the upper terminal of the exciter 66 through conductors 67 and 72, the actuating coil of the voltage relay 53 and conductor 73 to the lower armature terminal of the exciter 66.

Operation of the voltage relay 53 to its closed position establishes a circuit from the energized conductor 25 through the actuating coil of the voltage transfer relay 19, conductor 58, contact members 55 of voltage relay 53 to the bus 16. It will be noted that the contact members 20 of the voltage transfer relay 19, the contact members 54 of the voltage relay 53 and the contact members 57 of the resistor shunting relay 51 are all connected in series circuit relation. The opening of any one or all of these contact members, however, does not affect the master relay 3, since the holding circuit for master relay 3 through the contact members 32 and conductor 17 is a circuit in parallel to the circuit through the contact members 20, 54 and 57.

Operation of the voltage transfer relay 19 causes the opening of the contact member 21, and in consequence the circuit for the actuating coil of the low voltage contactor 6 is interrupted. A holding circuit for voltage transfer relay 19 is also established from the energized conductor 58 through contact members 23 to the bus 16. A further circuit is established by the operation of the relay 19 and the movement of the low voltage contactor 6 to its inoperative position. This circuit may be traced from bus 4, through conductors 18 and 24, contact members 31 of the master relay 3, conductor 25, contact members 62 of the low voltage contactor 6, conductor 59, the actuating coil of the full voltage contactor 42, conductor 60, the contact members 22 of the voltage transfer relay 19 to the bus 16.

From the sequence of operation of the various devices above discussed it is of course apparent that the full voltage line contactor 42 does not close before synchronism speed has been reached by the synchronous motor. With the operation of contactor 42 full voltage is applied to the synchronous motor. To prevent any decrease of the exciter voltage during the normal operation of the synchronous motor, a holding circuit for the resistor shunting relay 51 is established from the energized conductor 24 through the contact members 63 of the full voltage contactor 42 to the conductor 49, the actuating coil of relay 51 to the energized conductor 50.

For many installations the automatic motor starting control system above discussed is complete. However, it frequently happens that it is very desirable to prevent full excitation of the field windings of the synchronous motor during the initial stages of the starting operation. During the final stages of the starting operation and normal operation of the synchronous motor the excitation of the field windings 64 may be increased to any desired value. The solution of the problem just stated is attained by the insertion of the resistor 95 in the field circuit of the synchronous motor during starting and the shunting of this resistor after full voltage has been applied to the synchronous motor. Upon operation of the full voltage contactor 42, a circuit is established from the energized conductor 24 through the contact members 41, conductor 63', the actuating coil of the resistor shunting relay 93 and conductor 17 to the bus 16. The excitation circuit of the synchronous motor field may then be traced from the upper armature terminal of the exciter 66 through conductors 67 and 72, contact members 94 of the resistor shunting relay 93, conductor 74, field rheostat 75, the field windings 64, and conductor 76 to the lower armature terminal of the exciter 66.

I do not wish to be restricted to the specific structural details, arrangement of parts of circuit connections herein set forth, as various modifications thereof may be effected without departing from the spirit and scope of my invention. I desire, therefore, that only such limitations shall be imposed as are indicated in the appended claims.

I claim as my invention:

1. A motor-starting system comprising, in combination, a motor, a source of electrical energy, low-voltage starting connections for the motor, high-voltage running connections for the motor, means for connecting the motor to the source of power and means successively operable in response to a predetermined drop of motor-armature current and operable a predetermined interval of time after such drop in motor-armature current to transfer the motor from the low-voltage starting connection to the high-voltage running connection.

2. A motor-starting system comprising, in combination, a motor, a source of electrical energy, low-voltage starting connections for the motor, high-voltage running connections for the motor, means for connecting the motor to the source of power, transfer means for transferring the connection of the motor from the starting connections to the running connections, a time-limit device for controlling the operation of the transfer means and a relay responsive to a predetermined motor-armature current for starting the operation of the time-limit device.

3. A motor-starting system comprising, in combination, a synchronous motor, a source of alternating current energy, low-voltage starting connections for the motor, high-voltage running connections for the motor, means for connecting the motor to the source of energy through the low-voltage starting connections, an exciter mechanically connected to the motor and electrically connected to the field windings of the motor, transfer means for transferring the connection of the motor from the low-voltage starting connection to the high-voltage running connection, voltage responsive means responsive to the voltage of the exciter for controlling the transfer means, means for increasing the exciter voltage to effect the operation of the voltage responsive means, a time-limit device for controlling the operation of the voltage increasing means and a relay responsive to a predetermined motor-armature current and independent of said time-limit device for starting the operation of the time-limit device.

4. A motor-starting system comprising, in combination, a synchronous motor having the conventional armature and field windings, a source of alternating current power, low-voltage starting connections for the motor, means for connecting the motor to the source of power through the low-voltage starting connections, an exciter driven by the motor and electrically connected to the field windings of the motor, high-voltage running connections for the motor, transfer means for transferring the connection of the motor from the low-voltage starting connection to the high-voltage running connection, voltage responsive means, means for increasing the exciter voltage for controlling the voltage responsive means, a time-limit device for controlling the operation of the voltage increasing means, a relay responsive to a predetermined motor-armature current for controlling the operation of the time-limit device and means for increasing the voltage impressed on the field windings of the synchronous motor upon actuation of the voltage transfer means.

5. In a motor control system, in combination, a synchronous motor having armature and field windings, a source of alternating current power, low-voltage circuit connections for the motor, means for connecting the motor to the source of power through the low-voltage circuit connections, an exciter driven by the motor and connected across the field windings of the motor, means for varying the voltage of the exciter, high-voltage circuit connections for the motor, means responsive to the voltage variation of the exciter for disconnecting the motor from the source of power and connecting it to the source of power through the high-voltage circuit connections, a time-limit device for controlling the operation of the last named means, a current limit relay for starting the operation of the time-limit device.

6. In a motor control system, in combination, a synchronous motor having armature and field windings, a source of alternating current power, low-voltage circuit connections for the motor, means for connecting the motor to the source of power through the low-voltage circuit connections, high-voltage circuit connections for the motor and means responsive to a selected drop in armature current of the motor and operable a definite interval of time after the armature current is the selected value for disconnecting the motor from the source of power and connecting it to the source of power through the high-voltage circuit connections.

7. In a motor control system, in combination, a synchronous motor having armature and field windings, a source of alternating current power, low-voltage circuit connections for the motor, means for connecting the motor to the source of power through the low-voltage circuit connections, an exciter driven by the motor, means for varying the voltage of the exciter, high-voltage circuit connections for the motor and means for disconnecting the motor from the source of power and connecting it to the source of power through the high-voltage circuit connections, after the armature current has obtained a selected value, a selected interval of time has elapsed, and the excited voltage is a selected value.

8. In a motor control system, in combination, a synchronous motor having armature and field windings, a source of alternating current power, low-voltage circuit connections for the motor, means for connecting the motor to the source of power through the low-voltage circuit connections, an exciter driven by the motor, means for varying the voltage of the exciter, high-voltage circuit connections for the motor, means operable after the armature current of the motor is a selected value, and the lapse of a definite interval of time, and when the exciter voltage is a selected value, for disconnecting the motor from the source of power and connecting it to the source of power through the high-voltage circuit connections and means controlled by the operation of the means for connecting the motor to the high-voltage circuit connections for decreasing the resistance value of the field circuit of the synchronous motor.

MAURICE E. REAGAN.